(12) United States Patent
Kiefer et al.

(10) Patent No.: US 6,923,111 B2
(45) Date of Patent: *Aug. 2, 2005

(54) MOBILE CONTAINER FOR PERISHABLE GOODS

(75) Inventors: David D. Kiefer, Bloomington, IN (US); Jan M. Parker, Athens, GA (US)

(73) Assignee: Carrier Corporation, Farmington, CT (US)

( * ) Notice: Subject to any disclaimer, the term of this patent is extended or adjusted under 35 U.S.C. 154(b) by 401 days.

This patent is subject to a terminal disclaimer.

(21) Appl. No.: 10/083,973

(22) Filed: Feb. 27, 2002

(65) Prior Publication Data

US 2003/0159595 A1 Aug. 28, 2003

(51) Int. Cl.$^7$ .................................................. B60H 1/00
(52) U.S. Cl. ........................... 99/468; 99/475; 99/476; 99/482; 62/239
(58) Field of Search ........................ 99/468, 482, 467, 99/473–476; 62/239, 440, 457.1, 457.9, 326, 78; 426/524, 418–419

(56) References Cited

U.S. PATENT DOCUMENTS

| | | | | |
|---|---|---|---|---|
| 3,683,788 A | * | 8/1972 | McDonnell et al. | .......... 99/470 |
| 3,733,849 A | * | 5/1973 | Cantagalio et al. | ........... 62/414 |
| 5,778,557 A | * | 7/1998 | Leavens | ...................... 34/222 |
| 5,789,007 A | * | 8/1998 | Bianco | ........................ 426/263 |
| 5,801,317 A | * | 9/1998 | Liston et al. | ............. 73/863.81 |
| 5,965,185 A | * | 10/1999 | Bianco | ........................ 426/449 |
| 6,012,384 A | * | 1/2000 | Badalament et al. | ......... 99/475 |
| 6,077,160 A | * | 6/2000 | Franaszek et al. | ........... 454/292 |
| 6,202,434 B1 | * | 3/2001 | Hearne, Jr. | ................... 62/304 |
| 6,390,378 B1 | * | 5/2002 | Briscoe et al. | ............ 236/44 C |
| 6,431,060 B1 | * | 8/2002 | Gutheim | ....................... 99/475 |
| 6,443,056 B1 | * | 9/2002 | Kiefer et al. | .................. 99/475 |
| 6,457,402 B1 | * | 10/2002 | Parker et al. | ................. 99/475 |
| 6,763,677 B1 | * | 7/2004 | Burchill et al. | ............... 62/427 |

* cited by examiner

*Primary Examiner*—Drew Becker
(74) *Attorney, Agent, or Firm*—Wall Marjama & Bilinski LLP (57) ABSTRACT

An enclosed mobile container having a refrigeration unit for providing conditioned air to a mixing chamber located at the front of the container. Air penetratable cartons containing perishable produce are stacked in rows along the length of the container to create a pair of supply air plenums running along each side wall of the container and a return air aisle running along the center of the container. A gas generator is mounted in the mixing chamber to add a ripening agent to the conditioned air. Fans force the supply air from the mixing chamber into the plenums under pressure so that the supply air is passed through the cartons into heat transfer relationship with the produce and the air is returned to the mixing chamber via the center aisle. A fresh air exchanger is mounted in the container for venting the ripening agent to ambient after the completion of a ripening cycle.

7 Claims, 9 Drawing Sheets

MOBILE CONTAINER FOR PERISHABLE GOODS

FIELD OF THE INVENTION

This invention relates generally to a mobile container for transporting perishable produce and, more specifically, to a method and apparatus for closely regulating the temperature of the produce in transit.

BACKGROUND OF THE INVENTION

In U.S. Pat. No. 6,012,384 to Badalament, et al. there is disclosed a mobile container for storing perishable goods that ripen exothermically during transit. A refrigeration system is arranged to provide conditioned air to the container where it is combined with the air within a mixing chamber. Fan units are used to direct supply air from the mixing chamber into a pair of supply air plenums that extend down either sidewall of the container. Air penetratable boxes or cartons are stacked in rows along the one side of each plenum so that the supply air in each plenum can be forced through the cartons into heat transfer relationship with the produce that is stored in the cartons. The fan units are adapted to deliver air into the plenums at a high enough rate of flow to provide sufficient pressure to force the supply air through the stacks. The conditioned air that is forced through the stacks is then returned to the mixing chamber through a center aisle that is established between the rows of cartons.

The mobile container described in the Badalament, et al., patent provides an improved method of controlling the temperature of produce and, in particular, ripening produce while the goods are in transit. Although it is important to store perishable goods at a certain temperature during shipping, it is highly desirous when dealing with certain produce, such as bananas, to keep the goods in a dormant state for a period of time and then change the conditions within the container to promote ripening. When the produce reaches a desired state of ripeness, the produce is returned to the dormant state so that the goods are at a desired level of ripeness when they reach their destination.

At present, the industry does not have a mobile container having the versatility to economically cool freshly picked produce to remove "field heat" and to ripen the product under controlled conditions while the product is being shipped to market. Although these tasks can be handled separately in stationary units, the procedures are not only time consuming, but oftentimes fail to quickly remove field heat and produce damage to the goods due to excessive handling.

SUMMARY OF THE INVENTION

It is, therefore, an object of the present invention to improve mobile containers that are used to ship perishable goods.

It is a further object of the present invention to reduce the amount of handling needed in order to safely ship perishable goods to market.

A still further object of the present invention is to more rapidly remove field heat from perishable goods to extend the shelf life of the goods.

Another object of the present invention is to promote the ripening of perishable goods under closely controlled conditions as the goods are in transit to the market place.

Yet another object of the present invention is to control the ripening of produce under tightly controlled conditions while the goods are in transit.

These and other objects of the present invention are attained by means of a mobile container having a refrigeration system for introducing conditioned air into a mixing chamber located adjacent to the front wall of the container. Air penetratable cartons containing the goods are stacked in rows adjacent to each side wall of the container that extend back from the mixing chamber. A horizontal pressure bar and a vertical pressure bar are used to form a plenum chamber between the sidewalls of the container and the adjacent rows of cartons. A gas generator is mounted in the mixing chamber to introduce a ripening agent into the conditioned air to promote ripening of the produce. Fans are used to introduce supply air from the mixing chamber into each plenum chamber at a high volume to raise the pressure in the plenum chambers to a level wherein the supply air is forced through the carton in heat transfer relation with the goods. An automatically controlled fresh air exchanger is activated at the end of the ripening cycle to vent the container air ripening agent to ambient and replace the vented air with outdoor air. Drains in the back of the container are also closed at the start of the ripening cycle to raise the humidity within the container during the ripening cycle. In the perforated embodiment of the invention, the gas generator, fan units, fresh air exchanger and drains are all regulated by a programmable controller.

BRIEF DESCRIPTION OF THE DRAWING

For a further understanding of these and other objects of the invention, reference will be made to the following detailed description of the invention which is to be read in connection with the accompanying drawing, wherein.

DETAILED DESCRIPTION OF THE INVENTION

Figure 1:
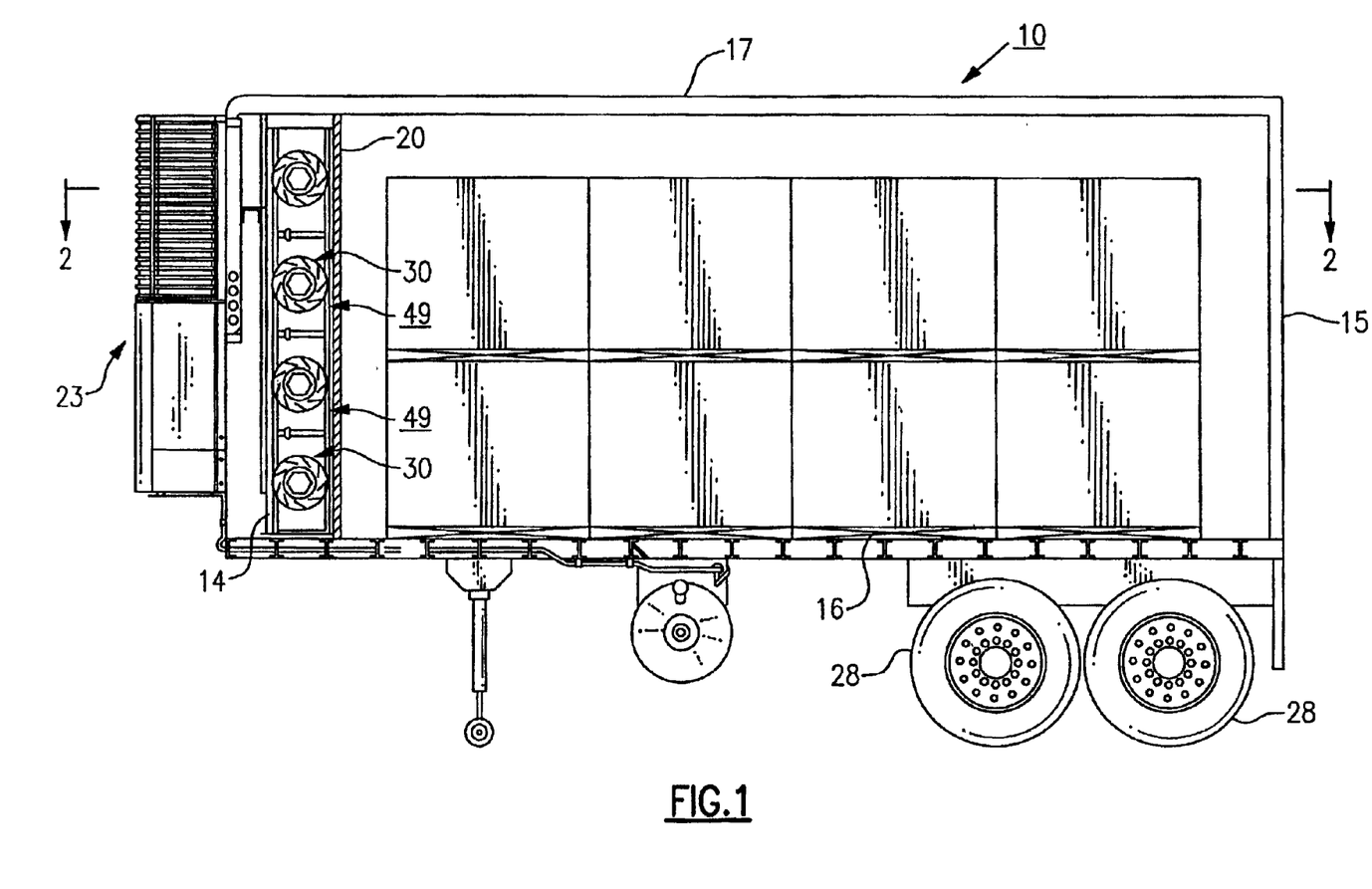
FIG. 1 is a side elevation of a mobile container embodying the teachings of the present invention.
Figure 2:
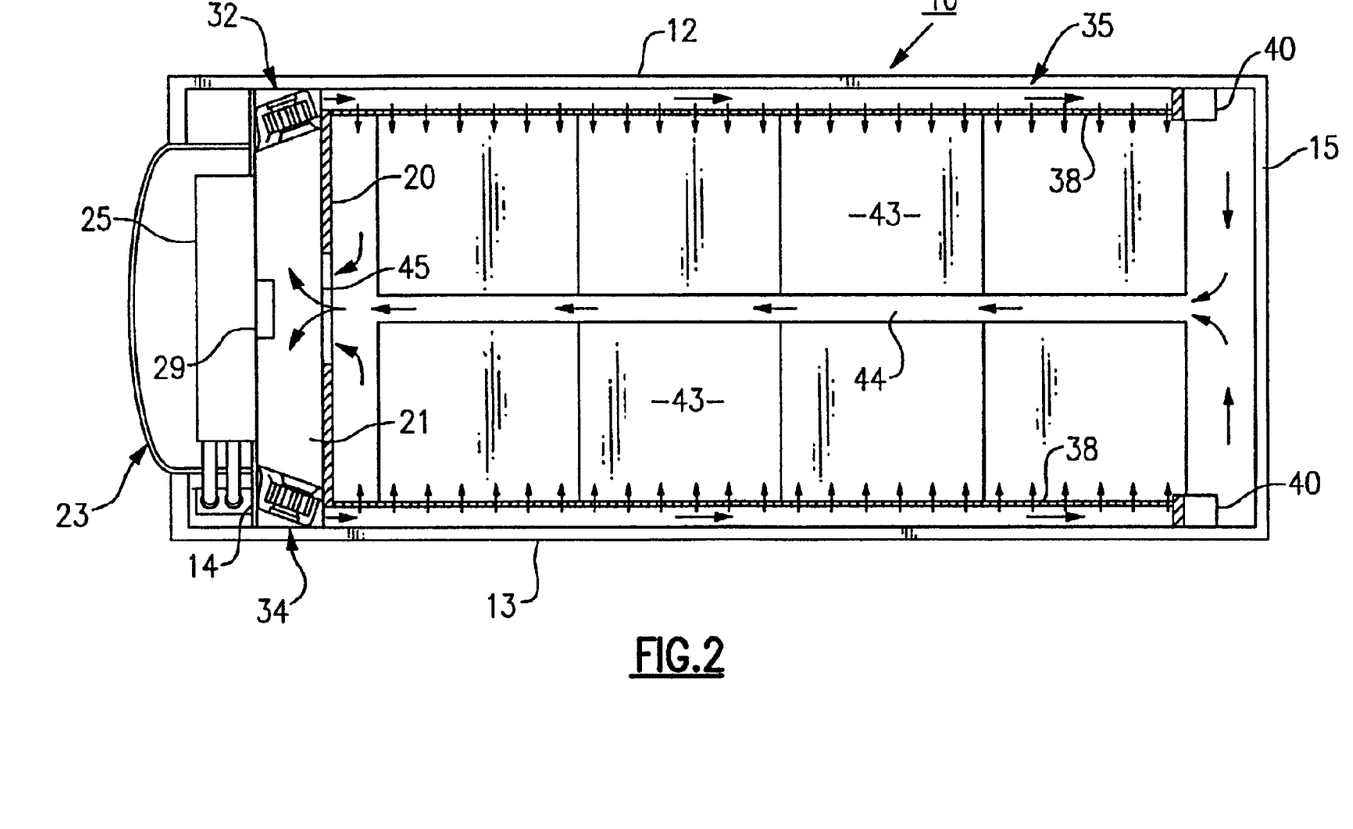
FIG. 2 is a sectional view of the container taken along lines 2—2 in FIG. 1.
Figure 3:
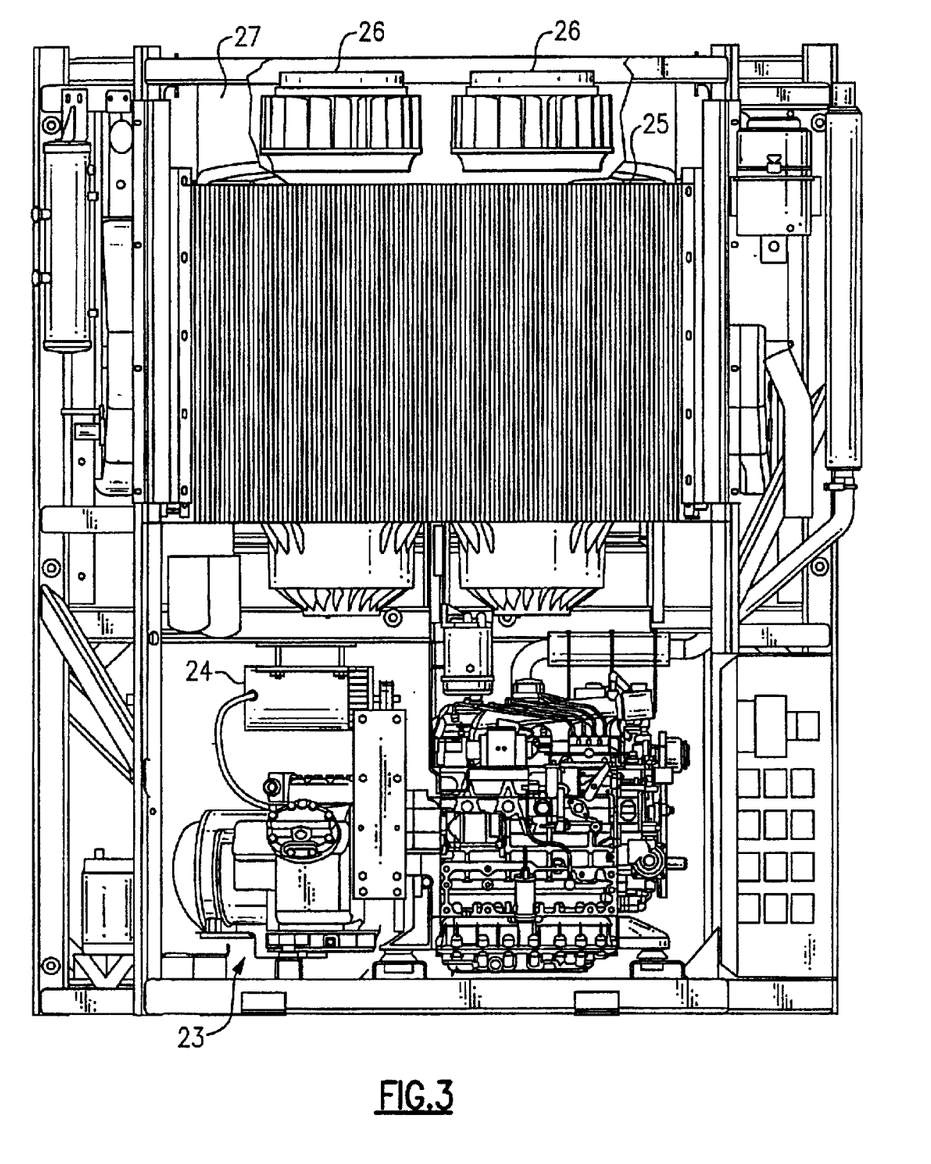
FIG. 3 is an enlarged front view of a refrigeration system employed in association with the container.

Referring initially to FIGS. 1–3, there is illustrated an enclosed mobile container, generally referenced 10, that embodies the teachings of the present invention. The container includes a pair of opposed sidewalls 12 and 13, a front wall 14, a rear wall 15, a floor 16 and a ceiling 17 all being of standard construction used throughout the industry. The back wall is furnished with one or more doors (not shown) through which cargo can be loaded into the container. A partition 20 that extends from the container floor to its ceiling is mounted inside the container adjacent to the front wall 14 to establish a mixing chamber 21 in the forward part of the container. A refrigeration unit 23 is mounted on the front wall of the container which includes an evaporator 25 that is arranged to deliver conditioned air into the mixing chamber. The container is provided with appropriate seals to prevent inside air from escaping from the container when the container doors are closed. As illustrated in FIG. 3, a pair of cooling fans 26—26 are mounted in the blower housing 27 of the evaporator for moving ambient air over the coils of the evaporator heat exchanger and discharge heat developed in the heat exchanger to the surrounding ambient. Accordingly, an area of high pressure is developed on one side of the blower housing and an area of relatively lower pressure is developed on the other side of the housing. A 5 KW generator 24 is mounted in the motor section of the refrigeration unit and is coupled to the motor by a drive mechanism. As will be explained in greater detail below, the generator is arranged to provide power to a number of components for controlling conditions within the container to remove field heat and promote ripening of produce while the produce is in transit.

The container is equipped with wheels 28—28 so that it can be transported by a cab or tractor from place to place. The mobile unit is intended to be used as a ripening room for certain perishable produce so that the ripening process can be closely controlled when the cargo is in transit. In certain applications, the produce is stored in a dormant condition and a ripening gas is mixed with the conditioned air within the mixing chamber which aids in the ripening process. As will be explained in greater detail below, a gas generator 29 is placed within the mixing chamber which introduces the ripening gas directly into the chamber to modify the atmosphere within the container for a predetermined period of time to allow the produce to reach a desired stage of ripeness. At that time, the gas flow is terminated and the ripening gas is purged from the container.

A series of fan units 30—30 are mounted in stacks within the mixing chamber adjacent the opposed side walls of the container. A first stack 32 containing four fan units is located adjacent to the curbside wall 12 of the container while a second stack 34 also containing four fan units is located adjacent to the roadside sidewall 13. The first stack 32 is arranged to draw air from the mixing chamber and direct the air toward the rear of the container along the curbside supply air plenum that is generally referenced 35 (FIG. 2) The second stack of fan units 34 is arranged to draw air from the mixing chamber and direct the air plenum 36 toward the rear of the container as illustrated. As will be explained in greater detail below, the roadside stack 34 is a mirror image of the curbside stack 32, however, each stack functions in the same manner to gain the same results. Each plenum is located adjacent to a side wall of the container so that the container wall forms one wall of the plenum. Each plenum further includes a back closure wall 40 that can be repositioned along the length of the plenum so that the length of the plenum may be adjusted depending upon the cargo that is in transit.

The cargo is carried in bins or cartons 43—43 which are stacked in parallel rows along one side of each plenum. The cartons are shown stacked against an open stacking frame 38-38 running along one side of each plenum. Although the stacking frame may be eliminated from the assembly without departing from the invention, the frames provide, in many applications, a convenient means to align the stacks into parallel rows. A curb running along the floor of the container, such as curb 39 illustrated in FIG. 5, may also be used to aid in the stacking of the cartons. The parallel rows, like the frames, are also open to air so that the air flowing down the supply air plenums can freely pass into and through the boxes in convective heat transfer relationship with the produce stored therein. A central aisle 44 is provided between the rows through which the air that has passed through the boxes can be returned to the mixing chamber. An air entrance opening 45 is contained in the partition 20 of the mixing chamber through which the conditioned air is returned to the mixing chamber. The return opening is coaxially aligned with the central aisle of the container and extends generally from the floor to the ceiling of the container.

Figure 5:
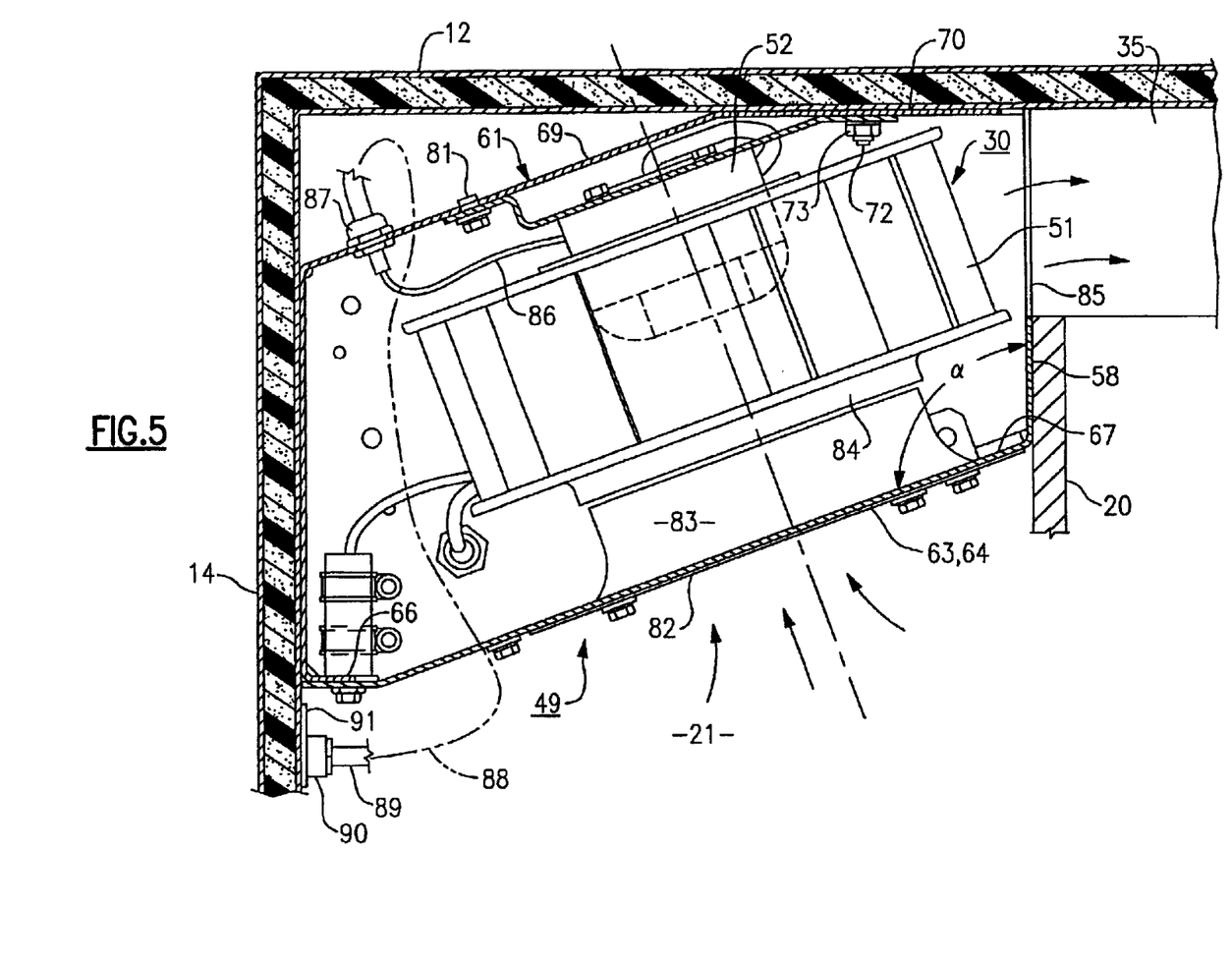
FIG. 5 is an enlarged section taken along lines 4—4 in FIG. 3.
Figure 6:
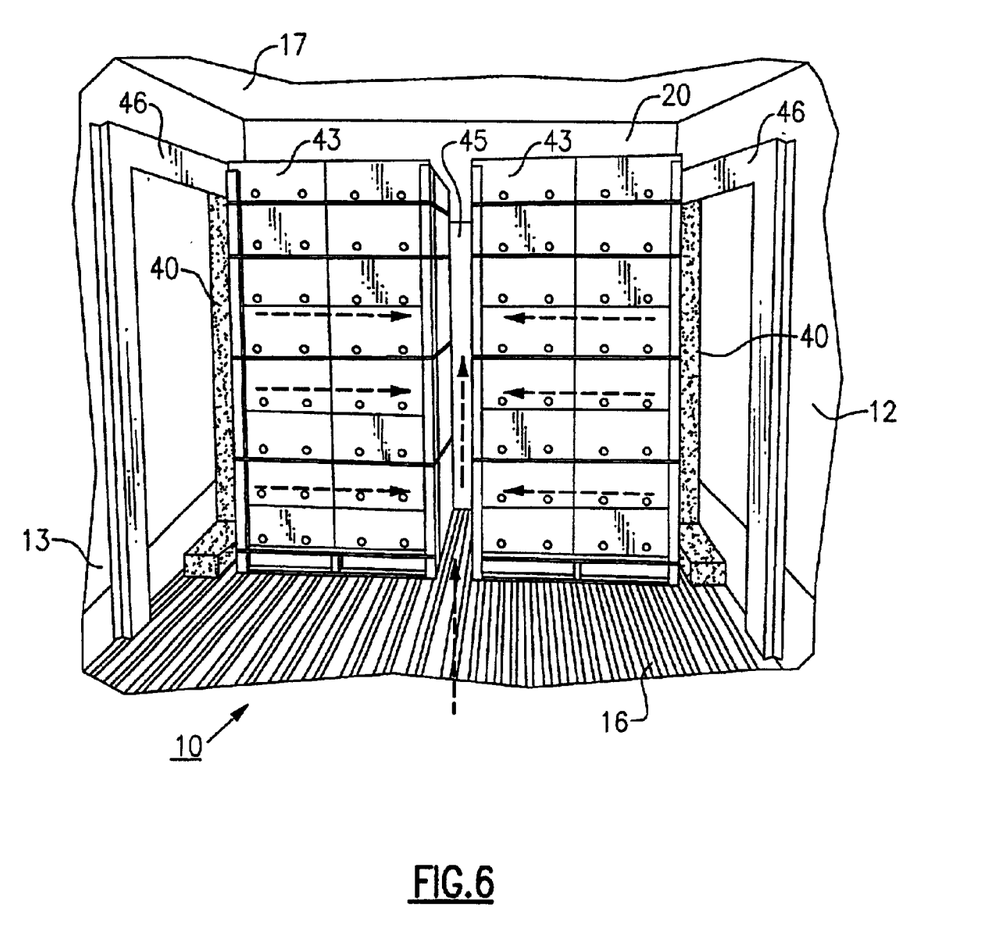
FIG. 6 is a partial rear view in perspective of the container.

As illustrated in FIG. 5, a horizontal pressure bar 46 is mounted upon each sidewall of the container that extends from the partition 20 of the mixing chamber rearwardly toward the rear of the container. An adjustable vertical pressure bar 40 is arranged to coact with each of the horizontal bars to define the length of each plenum chamber. The position of the vertical pressure bar can be varied depending upon the size of the load being carried in the container. The cartons are stacked against the pressure bars so that each plenum is generally an enclosed chamber that passes along one of the container side walls. The fan units are further arranged to supply a high volume of air into each plenum chamber so that each chamber becomes pressurized. As indicated by the arrows, sufficient air pressure is developed in each plenum to force the supply air into and through the carton so that a convective heat transfer is established between the supply air flow and the produce which allows for a very accurate control over the produce temperature. The air is passed into the center aisle and is returned to the mixing chamber. In the mixing chamber, the return air is mixed with the conditioned air delivered into the mixing chamber by the refrigeration unit. A rather turbulent air flow is thus created within the mixing chamber and, as a result, the ripening agent produced by the gas generator will be well mixed with the conditioned air any time the gas generator is activated.

Figure 4:
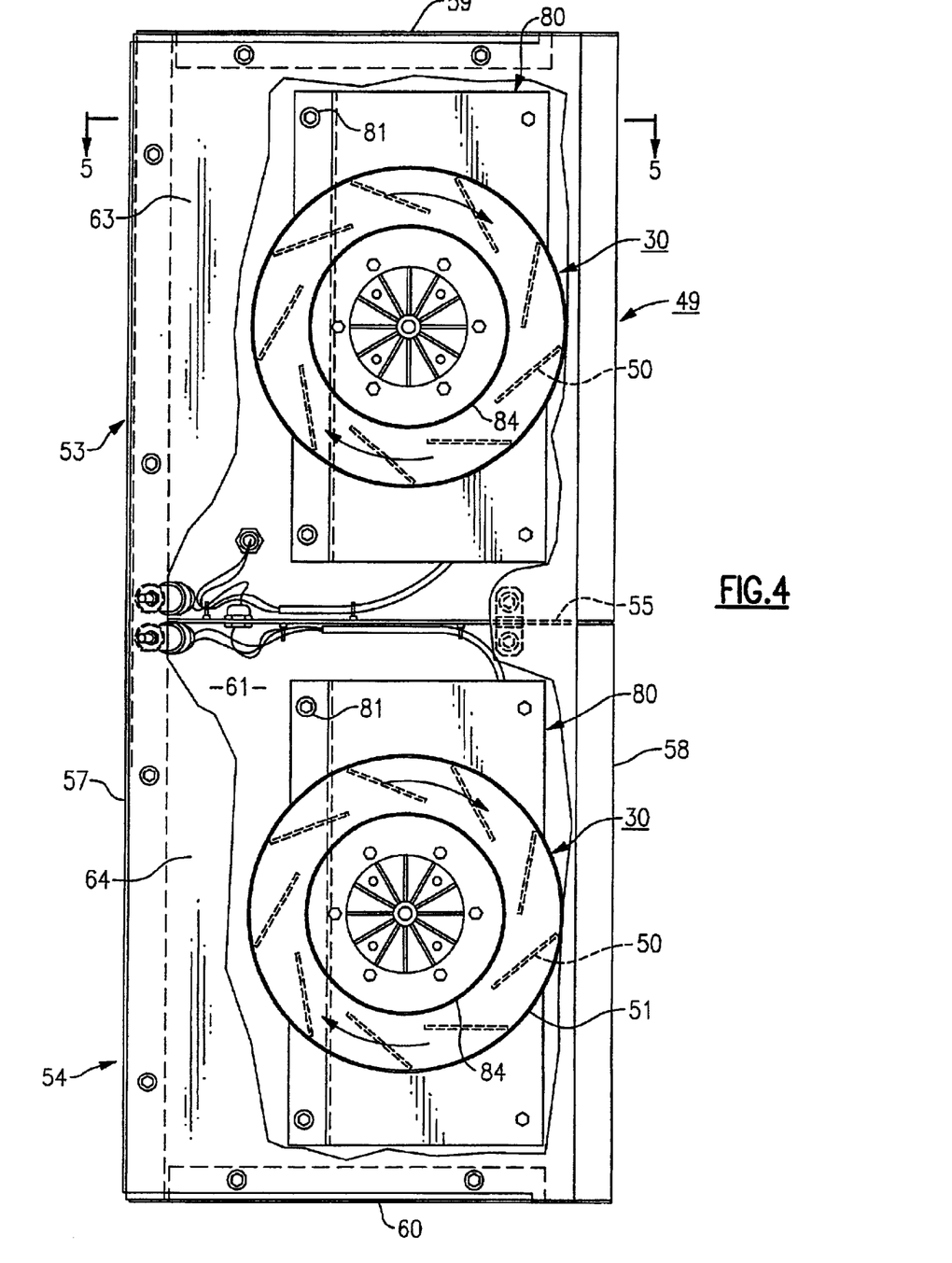
FIG. 4 is an enlarged front elevation illustrating one of the fan pods employed in the practice of the present invention.

With reference to FIGS. 3 and 4, there is illustrated a single fan pod, generally referenced 49, that is arranged to house two fan units 30 in the stack 32 that is located adjacent to the curbside wall 12 of the container. Each fan unit, in turn, includes a blower wheel 51 (FIG. 4) and a self-contained motor 52 for turning the blower wheel. Each blower wheel further includes backwardly inclined blades 50 designed to draw air from the mixing chamber and force the air into the adjacent supply air plenums. The motors all operate on 220 volt A.C. which is provided by a 5 KV generator 24 located in the drive section of the refrigeration system.

Each fan stack contains two pods, as illustrated in FIG. 3, that are placed one upon the other in each front corner of the container. The height of each stack is about equal to the inside height of the container as measured between the floor and the ceiling. Each pod is further divided into two compartments that include an upper compartment 53 and a lower compartment 54. The two compartments are separated by a commonly shared wall 55. Each pod further includes a pair of side panels 57 and 58, a top panel 59 and a bottom panel 60. A rear panel 61 encloses the back of the pod and a removable front panel 63 closes the front top compartment and a similar front panel 64 closes the front of the lower compartment. The front panels form an obtuse angle $\alpha$ with sidewall 58 and are joined to the pod side panels by threaded fasteners 65 that are threaded into flanges 66 and 67 that are integral with the side panels.

The back panel of the pod contains a first section 69 that is integrally joined to side panel 57 and which is parallely aligned with the front panels and a second section 70 that runs perpendicular to the side panels of the pod. In assembly, the side panel 57 of the cabinet is placed against the front wall of the container and the second section 70 of the back panel 61 is placed against the adjacent side wall of the container. The side panel 57 of the pod and the second section 70 of the back panel are secured to the container wall by studs 72, one of which is shown in FIG. 4, using nuts 73 so that the entire pod can be easily removed from the container.

A bracket, generally referenced 80, is mounted against the rear panel of the pod in each compartment for supporting the fan unit 30 within the compartment. Each bracket is secured to the rear panel by threaded fasteners 81—81 so that the bracket and the fan unit can be easily removed from the compartment as a unit in the event that the fan units need replacement or must be repaired. Each fan is placed at an angle within the compartment so that the front face of the fan is generally parallel with the front panel of the compartment. An air inlet opening 82 is provided in the front panel of each compartment and is encircled by an inlet nozzle 83 secured to the inside of the panel. The nozzle is arranged to conduct air from the mixing chamber into the front entrance 84 of the fan. The incoming air is captured in the backward extended blades of the fan and is pumped into the adjacent plenum via an outlet opening 85 provided in sidewall 58 of the pod.

The electrical line 86 servicing each motor is plugged into a receptacle 87 located in the back panel of each compartment enabling the fan unit to be quickly removed and replaced in its compartment. The wiring 88 from the receptacle 87 is enclosed with wiring from other fan units contained in the stack within a wiring harness 89 which, in turn, is plugged into a second receptacle 90 located in an electrical panel 91 carried on the front wall of the container. Here again, the harness can be disconnected from the container and the entire stack easily removed from the container. The harness wiring is passed behind the pod stacks in the space provided between the back panels of the pods and the walls of the container. The electrical panels servicing the stacks are located high on the front wall of the container so that the harness can be brought over the top of the stack and plugged into the electrical panel receptor. As a result, the wiring servicing the stacks is well isolated from the main body of the container and there is little or no danger of the wiring being entangled with other objects within the container.

Figure 9:
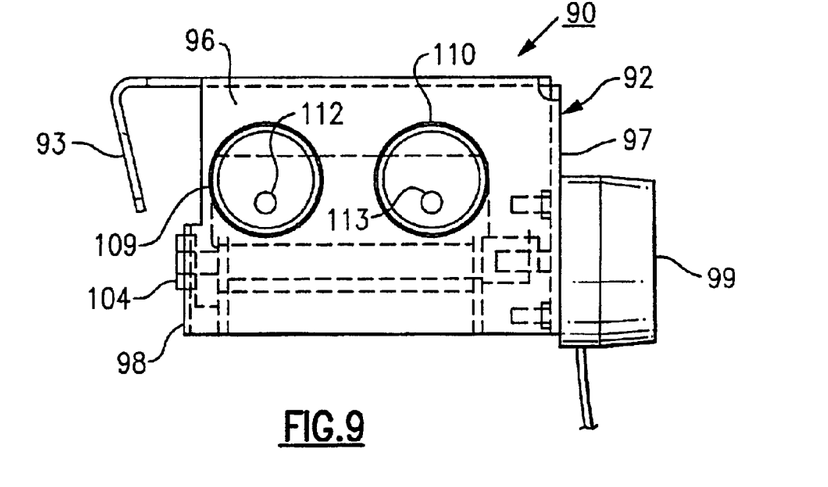
FIG. 9 is a top view of the fresh air exchanger unit.

Each harness servicing the fan pods is connected through the electrical panels to a control unit 100 shown in FIG. 9 that is programmed to activate the motor units in an ordered sequence. Power to the motors is provided by the 5 KW generator 24 that is driven off the main drive of the refrigeration unit. A time delay of about 10 seconds is employed to delay the start of the motor in one stack to reduce the current load on the generator during start up.

As noted above, the flow of air through the mixing chamber is rather turbulent due to the action of the blowers and the flow of conditioned air entering from the evaporator. As a result, the ripening gas produced by the gas generator 28 is thoroughly mixed with the conditioned air before reaching the produce. It is important to rapidly purge the gas from the trailer upon termination of the ripening cycle in order to closely control the ripening process and prevent over ripening of the produce. A fresh air exchanger unit generally referenced 90 is integrated into the refrigeration unit which serves to efficiently vent the gas filled conditioned air to ambient and exchange the vented air for fresh outside air.

Figure 7:
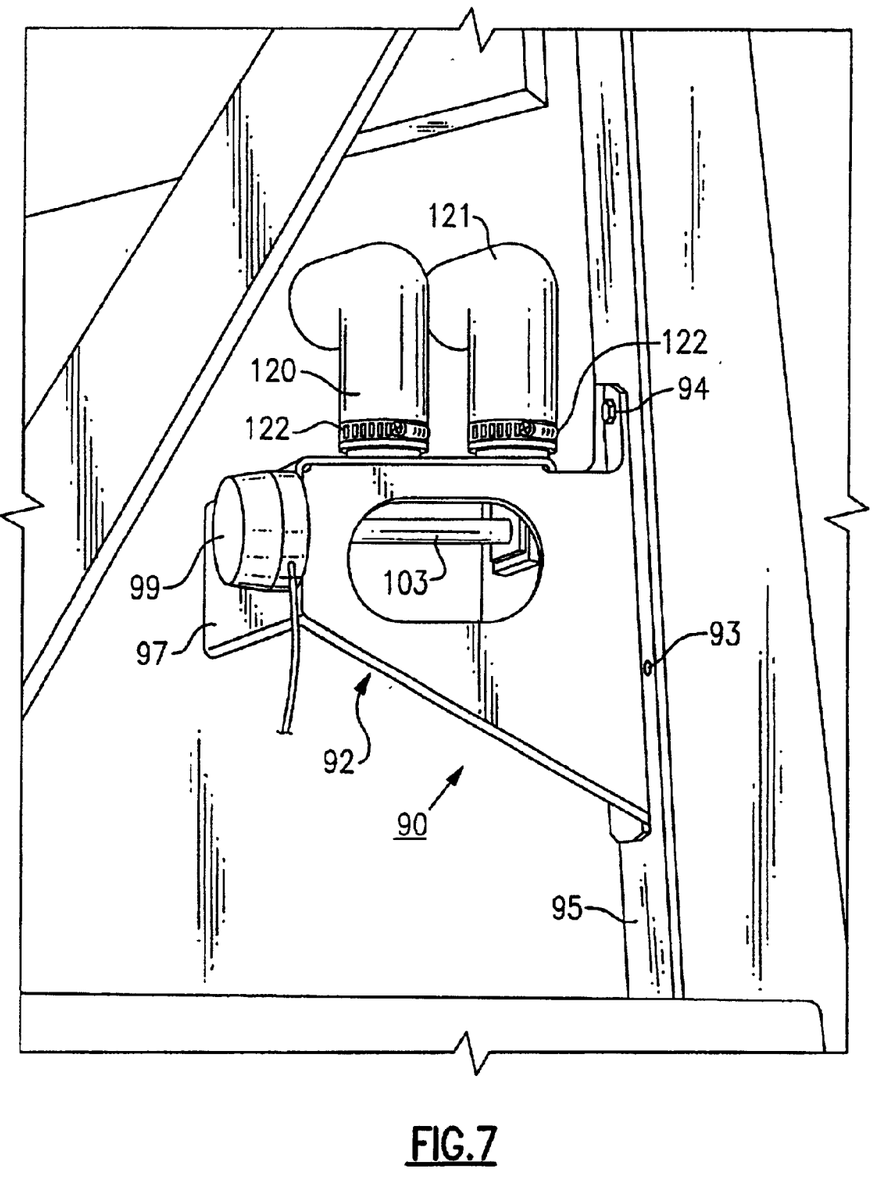
FIG. 7 is an enlarged perspective view of a fresh air exchanger unit employed in the practice of the present invention.
Figure 8:
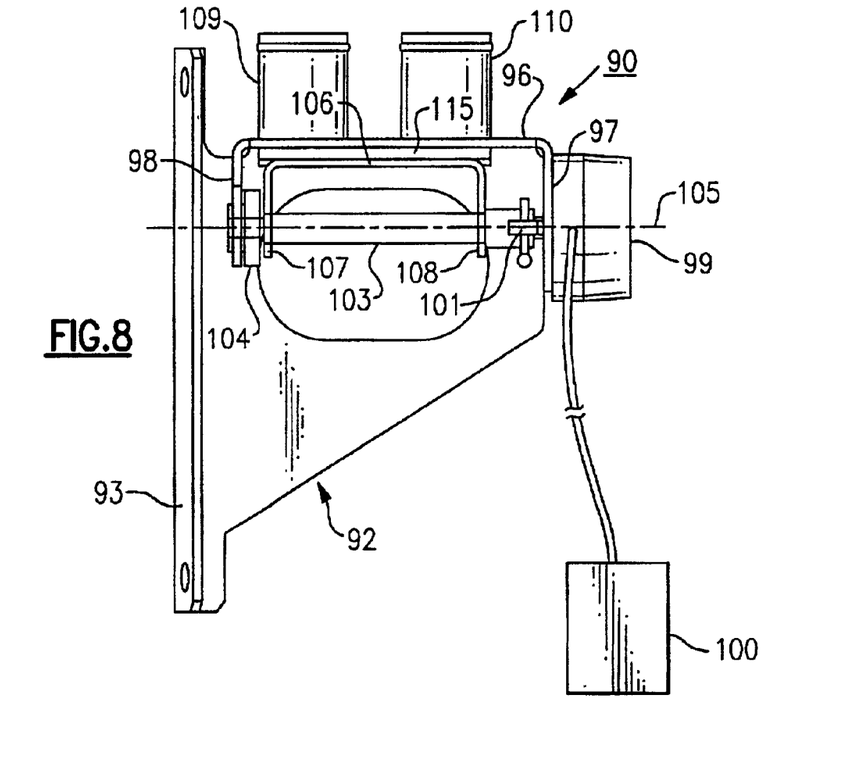
FIG. 8 is a side elevation of the fresh air exchanger unit shown in FIG. 7.

Referring now to FIGS. 7–9, the fresh air exchanger unit 90 is supported upon a bracket 92 that is mounted inside the refrigeration unit. The bracket is provided with a vertically disposed mounting flange 93 that is fastened by screws 94 to a vertical column 95 that forms part of the container's superstructure. The bracket contains a top shelf 96 and a pair of spaced apart arms 97 and 98 that are integral with the shelf and which extend downwardly from the shelf. An electrically driven rotary actuator 99 is mounted upon the outside of arm 97. The rotary actuator includes a drive shaft 101 that is adapted to pass through a clearance hole formed in the arm 97. The drive shaft is coupled to one end of an elongated drive shaft 103. The opposite end of the driven shaft is supported in a bearing 104 mounted in the opposing arm 98 so that the control shaft rotates about the vertical axis 105 of the actuator. A damper door 106 is connected to the driven shaft 65 by a pair of side plates 107 and 108 so that the damper door turns with the driven shaft. A pair of cylindrical connectors 109 and 110 are mounted upon the top surface of the bracket shelf.

As best illustrated in FIG. 9, a pair of metering ports 112 and 113 are passed through the shelf so that they open inside the connectors 109 and 110 respectively. The rotary actuator 99 is adapted to turn the door through about 45° of rotation. The damper door is, in turn, arranged to move between a closed position as shown in FIG. 4 wherein the door closes the two metering ports and an open position wherein the ports are fully opened to the surrounding ambient. A gasket 115 is placed between the door and the metering ports at closure to prevent air from passing through the ports when the door is closed. A pair of hoses 120 and 121 (FIGS. 2 and 3) are secured at one end to the connectors by clamps 122 and the opposite ends of the hoses are run into the evaporation section of the refrigeration unit. A first hose 120 is connected to the high pressure side of the evaporator section 25 while a second hose 121 is connected to the low pressure side of the evaporator section. Accordingly, when the damper door is opened, air from the high pressure side of the evaporator is forced out of the container and exhausted to the surrounding ambient. At the same time, fresh ambient air is drawn into the low pressure side of the evaporator to replace the air that is being exhausted.

The fresh air exchanger is arranged to act in association with the ripening gas generator 28, through means of the controller 100. The gas generator is initiated by starting a programmable timer situated in the controller (FIG. 4). At this time, the damper door is automatically closed by the actuator preventing container air from being exchanged for ambient air. The damper door remains closed until the timer cycles out at the end of a ripening cycle at which time the gas generator is cycled off and the damper door is opened automatically for a predetermined period of time or until another ripening cycle is initiated whereupon the damper door is again automatically closed.

Figure 10:
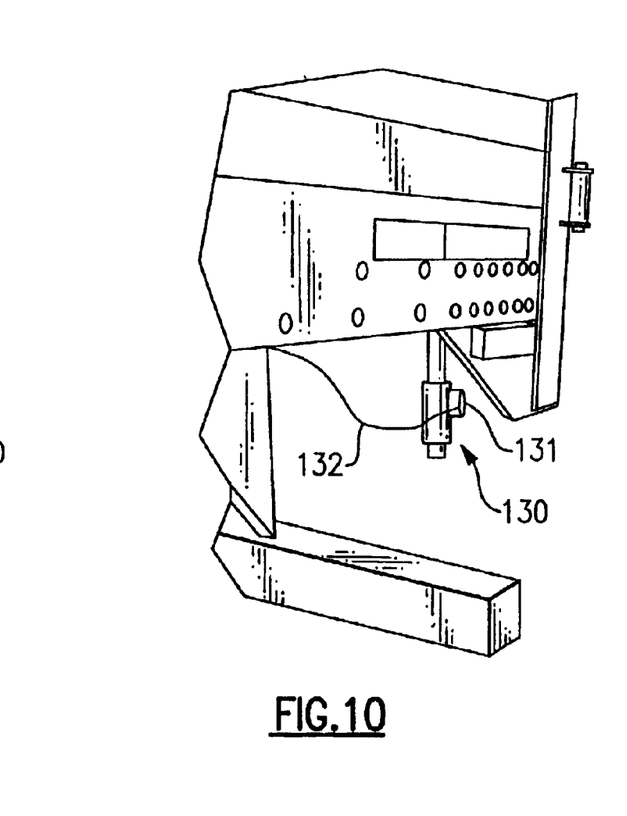
FIG. 10 is a partial perspective view of a remotely controlled drain valve located at the rear of the container.
Figure 11:
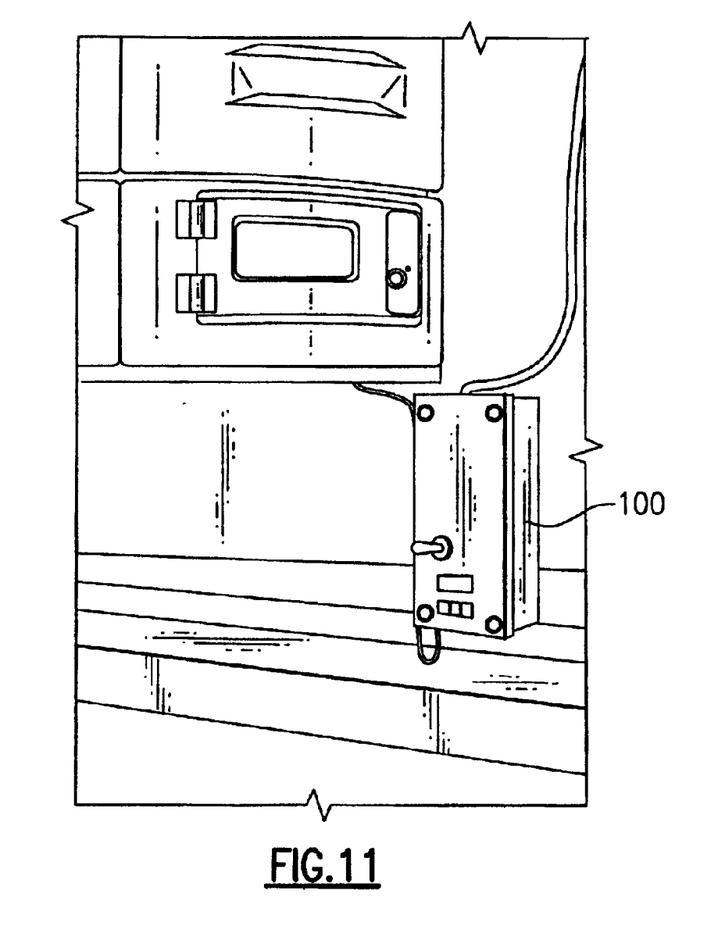
FIG. 11 is a partial perspective view of the programmable processor for controlling the apparatus of the present invention.

As illustrated in FIG. 10, one or more drains, generally referenced 130, are mounted in the floor of the container to drain off condensate that is produced by the refrigeration system evaporator. As is common in many mobile containers that are employed to transport perishable produce, the condensate from the system evaporator is channeled by various means into the container to help control the humidity within the container. Preferably, two drains are located at the rear of the container and are equipped with remotely controlled valves 131 although manually operated valves may be alternatively employed in the practice of the invention. In assembly, the drain valves are connected to the system controller 100 via lines 132. The controller is programmed to close the drains at the beginning of each ripening cycle. Between ripening cycles, the drains can be cycled in a programmed sequence to control the humidity within the container.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. Apparatus for closely controlling the temperature of perishable goods in a mobile container having a refrigeration unit for delivering conditioned air into a mixing chamber located adjacent the front wall of the container, said apparatus including:
    a pair of supply air plenum chambers extending rearwardly from the mixing chamber toward the rear of the container along the sidewalls of the container that are arranged to receive supply air from said mixing chamber, one wall of each plenum being spaced apart from an adjacent side wall of said container and being formed by a stacked row of air permeable cartons containing said perishable produce,
    fan means for delivering supply air from said mixing chamber into said plenum chambers at a volume rate of flow that is high enough to force the supply air into heat transfer relation with said produce contained in said cartons,
    a gas generator located within the mixing chamber for introducing a ripening agent into the conditioned air at the beginning of a ripening cycle,
    a fresh air exchanger unit which is normally in a closed condition to retain the conditioned air within said container during said ripening cycle and to exchange conditioned air with ambient air when placed in an open condition at the conclusion of said ripening cycle, and
    control means for activating the gas generator at the beginning of a ripening cycle and for automatically deactivating the gas generator at the end of a ripening cycle; and
    control means for determining when said gas generator is deactivated and responsively and automatically placing the fresh air exchanger unit in an open condition for a given period of time to vent the ripening agent from said container and automatically closing the fresh air exchanger when the ripening agent has been vented to ambient.

2. The apparatus of claim 1 wherein said fan means includes a series of fan units mounted in vertically aligned stacks at an entrance to each supply air chamber.

3. The apparatus o claim 2 wherein said mixing chamber contains a return air inlet through which conditioned air within the container is drawn by said fan means back into the mixing chamber.

4. The apparatus of claim 1 wherein each plenum chamber further includes a horizontal pressure bar secured to an adjacent side wall of the container and a movable vertical pressure bar for adjusting the length of the plenum chamber.

5. The apparatus of claim 1 that further includes drain means mounted in the floor of the container that is connected to the control means for placing the drain means in a closed position wherein moisture is maintained within the container during a ripening cycle and an open position wherein moisture in the container is released to the surrounding atmosphere.

6. The apparatus of claim 5 wherein said drain means further include a plurality of drains, each drain having remotely controlled drain valves for opening and closing said drain.

7. The apparatus of claim 2 wherein said fan means are connected to said control means which is programmed to activate the fan units in a given order.

* * * * *